Patented Nov. 20, 1945

2,389,491

UNITED STATES PATENT OFFICE 2,389,491

ABRASIVE ARTICLES

Ralph I. Dunlap and Robert J. Schatz, Springfield, Mass., assignors to Monsanto Chemical Company, St. Louis, Mo., a corporation of Delaware No Drawing. Application April 27, 1945, Serial No. 590,714

4 Claims. (Cl. 51—298)

This invention relates to abrasive articles and more particularly to articles made of abrasive grains bonded by thermosetting organo-silicon resins.

Heretofore grinding wheels and other abrasives have been made using a resinous material as a bond for the abrasive particles but they frequently have been unsafe for use at the high speeds required in many of the modern grinding processes.

It is an object of this invention to provide improved abrasive articles.

A further object is to provide resin bonded abrasive articles which can be used at higher grinding speeds.

These and other objects are attained by applying organo-silicon resins to abrasive grains and then molding the grains into a grinding wheel or by applying organo-silicon resins to a backing and then embedding abrasive grains in the resin.

The following examples are given in illustration of this invention and are not intended to limit the scope thereof. Where parts are mentioned they are parts by weight.

Example I 100 parts of #6 aluminum oxide abrasive grain were mixed with 5 parts of a xylol solution of a partially dehydrated methyl silicone resin containing 60% solids until the grains were thoroughly wet with the resin solution. 10 parts of a brittle, pulverulent, dehydrated methyl silicone resin were added and the mixture tumbled in a mill to coat the wetted aluminum oxide grits with resin. The resin coated grits were then cold molded into a grinding wheel 2 inches thick and 16 inches in diameter under 9000 p. s. i. pressure. The molded grinding wheel was placed in an oven and heated at a temperature gradually increasing from 100° to 250° C. for 40 hours and the temperature was then maintained at 250° C. for 8 hours.

Example II 100 parts of #46 silicon carbide abrasive grain were mixed with 15 parts of a highly viscous xylol solution of a partially dehydrated ethyl silicone resin containing 70% solids until the grains were thoroughly coated with the resin solution. The coated grains were then cold molded into a grinding wheel 1 inch thick and 12 inches in diameter. The molded wheel was then placed in an oven and heated at a temperature gradually increasing from 100° to 250° C. for 30 hours and the temperature was then maintained at 250° C. for 6 hours.

Example III

A xylol solution of a partially dehydrated phenyl methyl silicone resin containing 70% solids was calendered onto a web of glass cloth to impregnate the web with resin. While this coating was still wet, boron carbide abrasive grits of 250 mesh size were sprinkled onto the coating by feeding the grain over the resin-coated backing from a bin provided with a feed roll.

The web was dried by festooning in an oven at 125° C. for 5 hours and was then further cured at a temperature of 250° C. for 4 hours.

The organo-silicon resins of this invention are materials formed from organic derivatives of ortho silicic acid. The monomers may be considered as ortho silicic acids with one or more hydroxyl groups replaced by organic radicals such as alkyl, aryl, aralkyl, etc., and are prepared by hydrolysis of organo-silicon halides. Upon dehydration of the monomers, polycondensation occurs which yields resins of varying degrees of hardness. These resins cure under the influence of elevated temperatures to produce insoluble, infusible products.

In the preferred embodiment of this invention organo silicon resins are used in which an average of from ½ to 1½ organic groups have been substituted on the ortho silicic acid. Resins of this type may be cured to hard, brittle products which are highly adhesive towards abrasive grains and which do not soften at the relatively high temperatures caused by operating grinding wheels at high speeds.

If more than an average of 1½ organic groups are substituted on the ortho silicic acid, the resulting resins tend to be tougher and more thermoplastic than those having a smaller average number of substituents. For some abrasive purposes, these tough, thermoplastic resins are more desirable than the brittle type and either type may be modified with the other to obtain optimum properties for a particular application.

The amount of organo silicon resin used may be varied from 5 to 100 parts per 100 parts of abrasive grain depending on the type of abrasive article desired.

The organo-silicon resins may be further modified by the admixture with them of thermosetting resins such as phenolic, urea and melamine aldehyde condensation products and alkyd resins. The blend of organo-silicon resin with other thermosetting resins can be used to modify the properties of the resins to obtain a range of bond characteristics, each designed to fit a specific end use.

In Example I, a xylol solution of a partially dehydrated methyl silicone resin was used to wet the abrasive grains. Other low viscosity organo-silicon resins may be used in place of the methyl silicone resin. In general, it is desirable to use a partially dehydrated resin of essentially the same composition as the bonding resin for this purpose. However, other wetting agents commonly used in the abrasive trade may be used such as, liquid phenolic resins, cresylic acid, furfural, creosote oil, etc.

Various conventional modifying agents may be used such as fillers, e. g., powdered cryolite, etc.

In Example III, the web of glass cloth may be substituted by sheets or webs of cloth, flexible fiber board, or any other conventional backing which can withstand the temperature required to cure the resinous binder.

The bonding resin may be applied to the backing by any of the conventional methods such as calendering or simple immersion in a bath followed by doctor or squeeze rolls. The quantity of resin applied is dependent upon the size of the abrasive grain. In many cases, it is desirable to apply a sizing coating of silicone or other synthetic or natural resin over the surface of the grain-and-resin-coated backing.

The abrasive grains may be applied to the impregnated backing by any of the conventional means such as simply sprinkling the grains or by the more vigorously controlled methods of electromagnetic orientation of the grain of the resin-coated backing.

Abrasive articles made according to this invention are unaffected by temperatures up to 500° C. and thus are particularly advantageous for the production of high speed grinding wheels. The bond between the grains is similar in physical properties to that obtained in making vitrified grinding wheels and the process of producing the organo-silicon resin wheels is faster and more convenient than the vitrification process.

The foregoing description is intended to be illustrative and not limitative of this invention as set forth in the appended claims.

What is claimed is:

1. An abrasive article comprising abrasive grains bonded by a resinous condensation product of an organic derivative of ortho silicic acid in which an average of ½ to 1½ hydroxyl groups per molecule of ortho silicic acid have been replaced by one of the group consisting of organic alkyl, aryl and aralkyl radicals.

2. An abrasive article comprising abrasive grains bonded by a resinous condensation product of an organic derivative of ortho silicic acid in which an average of ½ to 1½ hydroxyl groups per molecule of ortho silicic acid have been replaced by methyl groups.

3. An abrasive article comprising abrasive grains bonded by a resinous condensation product of an organic derivative of ortho silicic acid in which an average of ½ to 1½ hydroxyl groups per molecule of ortho silicic acid have been replaced by ethyl groups.

4. An abrasive article comprising abrasive grains bonded by a resinous condensation product of an organic derivative of ortho silicic acid in which an average of ½ to 1½ hydroxyl groups per molecule of ortho silicic acid have been replaced by phenyl and methyl groups.

RALPH I. DUNLAP.
ROBERT J. SCHATZ.